US006926951B2

(12) United States Patent
Huffer et al.

(10) Patent No.: US 6,926,951 B2
(45) Date of Patent: Aug. 9, 2005

(54) LAMINATE FOR GUM PACKAGING

(75) Inventors: Scott W. Huffer, Hartsville, SC (US);
Jeffrey M. Schuetz, Florence, SC (US);
Don McArthur, Pennellville, NY (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 09/826,236

(22) Filed: Apr. 4, 2001

(65) Prior Publication Data

US 2002/0146525 A1 Oct. 10, 2002

(51) Int. Cl.[7] .............................................. B32B 3/00
(52) U.S. Cl. ..................... 428/204; 428/34.3; 428/35.3; 428/35.4; 428/195.1; 428/458; 428/484.1; 206/497; 206/800; 229/87.01; 229/87.07; 156/307.1; 426/106; 426/107; 427/412.1
(58) Field of Search .................. 427/412.1; 229/87.01, 229/87.07; 426/106, 107; 206/800, 497; 428/34.3, 35.3, 35.4, 195.1, 484.1, 34.8, 35.8; 156/307.1

(56) References Cited

U.S. PATENT DOCUMENTS

| 1,272,004 | A | | 7/1918 | Campbell | |
|---|---|---|---|---|---|
| 1,275,904 | A | | 8/1918 | Grotta | |
| 2,008,361 | A | | 7/1935 | Lindsey | 229/51 |
| 2,079,328 | A | | 5/1937 | McBean | 229/51 |
| 2,140,748 | A | | 12/1938 | Johanson | 229/87 |
| 2,301,997 | A | | 11/1942 | Basilone et al. | 229/87 |
| 3,106,333 | A | | 10/1963 | Bulovic | 229/87 |
| 3,237,843 | A | | 3/1966 | Reed et al. | 229/51 |
| 4,008,115 | A | | 2/1977 | Fairbanks et al. | 156/267 |
| 4,070,497 | A | | 1/1978 | Wismer et al. | 427/44 |
| 4,082,594 | A | | 4/1978 | Stonehouse | 156/253 |
| 4,177,310 | A | * | 12/1979 | Steeves | 427/250 |
| 4,246,297 | A | | 1/1981 | Nablo et al. | 427/44 |
| 4,381,322 | A | | 4/1983 | Bahr et al. | 427/179 |
| 4,410,560 | A | | 10/1983 | Kosterka | 427/44 |

(Continued)

FOREIGN PATENT DOCUMENTS

| CH | 664 971 A | 4/1988 | |
|---|---|---|---|
| EP | 0 339 670 | 11/1989 | B41M/5/26 |
| EP | 0 502 330 | 5/1992 | B32B/27/10 |
| EP | 0 737 593 | 10/1996 | B41M/7/00 |
| EP | 0 870 695 A1 | 10/1998 | |

(Continued)

OTHER PUBLICATIONS

Japanese Patent Abstract, No. 02–117826.
Japanese Patent Abstract, No. 07–186514.
Novelty Radiation Curable Silicone Acrylates with Extraordinary Features, Dr. Dietmar Wewers, Paper 1, Radtech Europe Edinburgh 29th /Sep.–2nd Oct. 1991.
UV/EB Paper Coatings: Old and New, D.J. Cyterski; Polymers, Laminations and Coatings Conference 1984.
Cure for Coating, Alexander T, Packaging Week, vol. 3, No. 12, Jul. 29, 1987.

(Continued)

*Primary Examiner*—Rena Dye
*Assistant Examiner*—Tamra Dicus
(74) *Attorney, Agent, or Firm*—Drinker Biddle & Reath LLP

(57) ABSTRACT

A laminate for gum packaging is defined. The laminate includes a metal layer, a polymer layer, a paper layer, and an electron beam cured coating. The laminate provides as good or better barrier properties as a conventional laminate for gum packaging. However, the laminate has "reacted-in" slip agents in the electron beam cured coating, thereby avoiding the common problems of slip agent migration. Further, the laminate of the invention is more economical to produce than is the conventional laminate.

25 Claims, 2 Drawing Sheets

U.S. PATENT DOCUMENTS

| | | | |
|---|---|---|---|
| 4,490,409 A | 12/1984 | Nablo | 427/44 |
| 4,522,887 A | 6/1985 | Koebisu et al. | 428/461 |
| 4,577,205 A * | 3/1986 | Shibata et al. | 503/204 |
| 4,654,379 A | 3/1987 | Lapin | 522/15 |
| 4,810,745 A | 3/1989 | Pike et al. | 524/516 |
| 5,017,429 A * | 5/1991 | Akao | 428/349 |
| 5,019,202 A | 5/1991 | Kawahata et al. | 156/277 |
| 5,048,260 A | 9/1991 | Raymond et al. | 53/370.8 |
| 5,070,121 A | 12/1991 | Hinterwaldner et al. | 524/31 |
| 5,110,643 A * | 5/1992 | Akao et al. | 428/35.9 |
| 5,268,230 A | 12/1993 | Edwards | 428/409 |
| 5,376,388 A | 12/1994 | Meyers | 426/5 |
| 5,436,073 A | 7/1995 | Williams et al. | 428/343 |
| 5,478,643 A * | 12/1995 | Peiffer et al. | 428/332 |
| 5,482,780 A | 1/1996 | Wilkie et al. | 428/515 |
| 5,492,733 A | 2/1996 | D'Anna et al. | 427/517 |
| 5,510,124 A * | 4/1996 | Kopecky et al. | 426/5 |
| 5,540,916 A | 7/1996 | Parks | 424/76.1 |
| 5,548,005 A | 8/1996 | Kurth et al. | 523/414 |
| 5,562,994 A | 10/1996 | Abba et al. | 428/464 |
| 5,650,453 A | 7/1997 | Eckberg et al. | 522/31 |
| 5,674,626 A | 10/1997 | Khatib et al. | 428/447 |
| 5,693,385 A | 12/1997 | Parks | 428/34.2 |
| 5,725,909 A | 3/1998 | Shaw et al. | 427/412.1 |
| 5,741,505 A | 4/1998 | Beyer et al. | 424/439 |
| 5,763,048 A | 6/1998 | Takahashi | 428/147 |
| 5,783,266 A * | 7/1998 | Gehrke | 428/34.3 |
| 5,798,174 A | 8/1998 | Wilkie | 428/347 |
| 5,804,301 A | 9/1998 | Curatolo | 428/352 |
| 5,851,610 A * | 12/1998 | Ristey et al. | 428/34.9 |
| 5,885,630 A | 3/1999 | Zurawski et al. | 426/5 |
| 5,888,649 A | 3/1999 | Curatolo et al. | 428/352 |
| 5,945,183 A | 8/1999 | Johnson | 428/34.9 |
| 5,981,047 A | 11/1999 | Wilkie | 428/215 |
| 5,984,363 A | 11/1999 | Dotson et al. | 283/61 |
| 5,985,426 A | 11/1999 | Wilkie | 428/215 |
| 5,989,377 A | 11/1999 | Wilheim et al. | 156/230 |
| 5,993,960 A | 11/1999 | Nakayama et al. | 428/345 |
| 6,001,397 A | 12/1999 | Boyd et al. | 426/5 |
| 6,010,724 A * | 1/2000 | Boyd et al. | 426/5 |
| 6,010,757 A * | 1/2000 | Yamamoto et al. | 428/1.25 |
| 6,045,654 A * | 4/2000 | Kjelgaard et al. | 156/244.24 |
| 6,228,486 B1 | 5/2001 | Kittel et al. | 428/354 |
| 6,291,062 B1 * | 9/2001 | Oshima et al. | 156/235 |
| 6,337,113 B1 * | 1/2002 | Muggli et al. | 428/35.2 |
| 6,426,507 B1 | 7/2002 | Rangwalla et al. | 250/492.3 |
| 6,528,127 B1 | 3/2003 | Edlein et al. | 427/404 |
| 2002/0100194 A1 | 8/2002 | Huffer et al. | 40/310 |
| 2002/0106465 A1 | 8/2002 | Huffer et al. | 428/35.2 |
| 2002/0119295 A1 | 8/2002 | Speer et al. | 428/195 |
| 2003/0027009 A1 | 2/2003 | Bray et al. | 428/519 |

FOREIGN PATENT DOCUMENTS

| | | | |
|---|---|---|---|
| GB | 2 156 362 | 9/1985 | C08K/5/19 |
| GB | 2 156 362 | 10/1985 | C08K/5/19 |
| GB | 2 284 787 | 6/1995 | B41F/23/04 |
| GB | 2 298 818 | 9/1996 | |
| GB | 2 320 911 | 7/1998 | |
| JP | 9-302264 | 11/1997 | C09D/4/00 |
| WO | WO 90/06265 | 6/1990 | B65D/30/08 |
| WO | WO 91/05706 | 2/1991 | B65B/7/18 |
| WO | WO 96/29205 | 9/1996 | |
| WO | WO 00/35671 | 6/2000 | B32B/27/30 |
| WO | WO 00/53429 | 9/2000 | B41M/7/00 |
| WO | WO 01/94451 | 12/2001 | C08J/7/00 |

OTHER PUBLICATIONS

Electron Radiation Curing Resin Composition and Composite Sheet Material Produced by Using the Composition, Japanese Patent Application No. 11105138 (Publ. No. 2000297218 A).

Application & Film Formation: UV and EB Curing, S.J. Bett et al., Jocca 1990.

Oberflächenveredelung mit UV–und EB–härtenden Silicon–Acryaten als Trennbeschichtung, Günter M. Miles, Coating Feb. 1996.

Radiation–curable additives for coatings and printing inks, Karen Bowling et al., PCCJ, Aug. 1997.

Electron Beam Curing of Epoxy–Silicone Release Coatings, Stuart R. Kerr III, Adhesive Age, 1998.

Manufacturers of Waterbase, UV+EB Curable Coatings, Varnishes and Adhesives; Bags, Multiwall & Others Move to High End Graphics, Cork Tech TalkNews; Apr., 2000.

Neue UV–härtbare System für Überzugslacke, Kaschier– und Haftklebstoffe; 21. Munchner Klebstoff–und Veredelungsseminar, 1996.

Present Status of Radiation Processing in Asia; RadTech Asia 1991.

Silicone Acrylate System, Ebbrecht T. et al., EuroCoat, Sep. 1992.

Today's Electron Beam: A Competitive Advantage for Packaging, Edward F. Maguire, RadTech Report, Sep./Oct. 1997.

Derwent Published Abstract XP–002194997 of JP200297218, dated Oct. 24, 2000.

Derwent Published Abstract XP–002205356 of JP04041563, dated Feb. 12, 1992.

Derwent Published Abstract XP–002219129 of JP2000043207, dated Feb. 15, 2000.

McIntyre, "UV–Cured Durable Top Coats: A Replacement for OPP & PET Film Laminations," Presented at Future–Pak 1997, Oct. 28–29, 1997 (together with MCTC–2138 & 2139 Data Sheets).

Morton Adhesives, Mor–Quik® 477 Coating Data Sheets (Feb. 22, 1998).

Morton Adhesives, Mor–Quik® 333 Coating Data Sheets (Sep. 2, 1998).

Northwest Coatings Corp., "Adhesives and Coatings that Exceed our Customers' Expectations," Product Brochures and Product Sheets, (undated).

Fletcher, "New Lower–Voltage EB Systems for Curing Polymers and Coatings," Journal of Coatings Technology, vol. 65, No. 822, pp. 61–63 (Jul. 1993).

Ravijst, "Radiation Cure Applications in the Packaging Industry," Packaging, India, pp. 107–109 (Dec. '97).

Guarino, "A Review of Properties and Uses of Radiation Curing for the Near Term and Future," 1990 Polymers, Laminations & Coatings, pp. 891–893 (TAPPI Proceedings 1990).

Pierce & Stevens Corp., Miracure EB Curable Coatings, Product Brochure, "Formulated for Success: Coatings & Adhesives for Packaging and Graphic Arts" (Nov. 1998).

McIntyre, "Total Package Concept: Electron Beam Technology for Barrier, Adhesive, and Overcoat Applications," Presented at Future–Pak '95 (20 pages) (Sep. 13–15, 1995).

Harris, "UV Coating—beyond stick and shine," FlexoTech, pp. 21–22 (June 1998).

Leach et al., The Printing Ink Manual, Chapter 11, pp. 636–677 (Fifth Ed., Kluwer Academic Publishers 1993).

Document entitled "Bottle Wrap Structures and Costs", showing a bottle wrap structure that may have been proposed at least as early as Feb. 14, 1997.

Document entitled "Bottle Wrap Structures and Costs", showing a bottle wrap structure that may have been proposed at least as early as April 6, 1998.

Document entitled "Bottle Wrap Back Up Math", showing a cost savings analysis that may have been proposed at least as early as Jun. 16, 1998.

Document entitled "Huntsman Packaging", showing a structure that may have been proposed at least as early as Oct. 1, 1996.

* cited by examiner

LAMINATE FOR GUM PACKAGING

FIELD OF THE INVENTION

The invention relates to the packaging of chewing gum. Specifically, the invention is directed to an improved laminate for the outer wrapper of gum packaging.

BACKGROUND OF THE INVENTION

Chewing gum packaging formed from laminates is known. The laminates used for gum packaging are designed to minimize the transmission of oxygen and moisture. Conventionally, sticks of chewing gum are packaged in two separate wrappers, an inner wrapper disposed around each individual stick of gum, and an outer wrapper housing a plurality of sticks. The outer wrapper is known in the industry as a counterband.

Some issues facing packagers of chewing gum are discussed in U.S. Pat. No. 5,376,388 to Meyers, which is incorporated herein by reference.

Chewing gum loses or gains moisture from the environment depending on the ambient temperature, humidity, and packaging type. The gain or loss of moisture also depends on the shape and composition of the chewing gum. Chewing gums with sugar generally have corn syrup and a small amount of humectant such as aqueous sorbitol or glycerin. These gums tend to dry out and become brittle when stored in ambient humidity less than 50%. Higher ambient temperatures exasperate the gum's tendency to dry out.

Sugarless gums typically contain lower amounts of moisture than sugar-containing gums. It is particularly important to maintain a low moisture content in sugarless gums which are sweetened with aspartame or other moisture-sensitive artificial sweeteners, thus preventing the loss of flavor. These sugarless gums have a lower initial moisture content and higher level of hygroscopic ingredients than do sugar-containing gums. Thus, sugarless gums tend to gain moisture when exposed to relative humidity above 40%, causing degradation of the moisture-sensitive ingredients.

It is known to package chewing gum in a laminate formed from a tissue or paper substrate that defines an inner surface for contacting the chewing gum and a metal foil outer surface. The metal foil provides resistance to the transmission of both moisture and vapor. This laminate will be referred to as the inner wrapper.

Typically, the inner wrapper does not provide sufficient barrier properties for long term storage of chewing gum. Thus, it is common to house a group of individually wrapped gum sticks in an outer wrapper or counterband. The conventional counterband is a laminate having greater long term resistance to the passage of gas and moisture. A conventional counterband may comprise numerous layers; one known structure being: (1) aluminum foil; (2) polyethylene; (3) paper; (4) adhesive; (5) reverse printed ink; (6) oriented polypropylene; and (7) release over-laquer. The counterband seals and contains the sticks of gum wrapped in their inner wrappers until a consumer tears open the counterband to remove the first stick.

Although the inner wrapper and counterband provide sufficient barrier properties for the long term storage of chewing gum, the system raises a number of issues. The cost of the laminates is one issue. Utilization of multi-layer laminates in place of simple paper webs substantially increases packaging costs. For at least some chewing gums, packaging costs can comprise a substantial portion of the product's overall cost. However, without the use of laminates, the shelf-life of chewing gum would be substantially reduced.

Another issue facing the packagers of gum is the well known problem of slip agent migration. Slip agents, commonly found in laminates, enhance the processing thereof by reducing the coefficient of friction of the laminate as measured against itself and against machine parts across which the laminate may slide during processing. The decreased coefficient of friction allows the laminate to be easily moved across such surfaces without ripping or wrinkling. However, slip agents are prone to migration which can cause delamination of the laminate as well as interference with adhesion of metallized coatings.

SUMMARY OF THE INVENTION

The present invention is directed to a new laminate which is especially well suited for gum packaging. The invention is more specifically directed to a laminate ideal for forming a counterband for packaging a stack of chewing gum sticks. The preferred embodiment of the new laminate comprises a foil layer, a polymer web, a paper web, surface printed ink, and an electron beam cured layer. The electron beam cured layer contains slip agents which are "reacted-in", solving the common problem of slip agent migration. A wax layer is also preferably provided, the wax being used to seal the package.

The laminate of the present invention is more economical to produce than a conventional laminate for gum packaging. Production of a laminate according to the present invention requires fewer raw materials than does a conventional gum packaging laminate. Further, the laminate of the present invention may be produced in fewer manufacturing steps.

BRIEF DESCRIPTION OF THE DRAWING

For the purpose of illustrating the invention, there is shown in the drawings a form which is presently preferred; it being understood, that this invention is not limited to the precise arrangements and instrumentalities shown.

DETAILED DESCRIPTION OF THE DRAWING

With reference to the drawings, there is shown a laminate generally identified by the numeral 10. The laminate 10 is preferably preprinted and is ideally suited for use in gum packaging.

Figure 1:
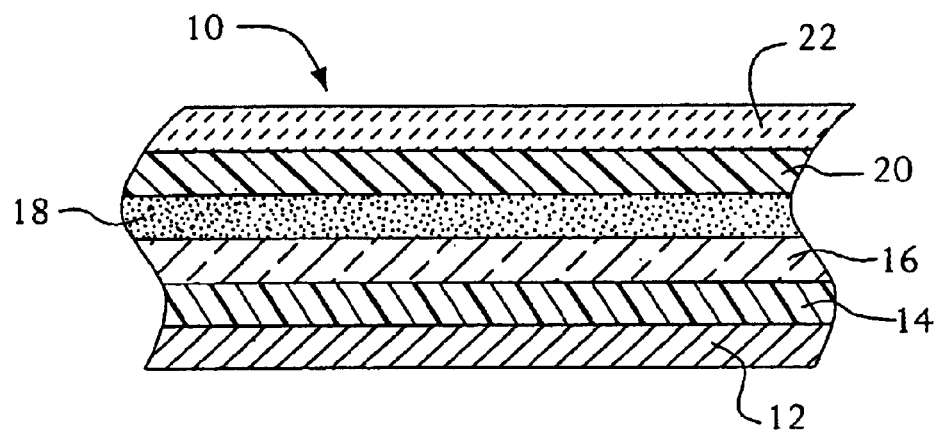
FIG. 1 is a schematic cross sectional view of a laminate according to the present invention.

A preferred embodiment of the invention, represented by laminate 10, is formed using a number of layers, as shown in FIG. 1. The layers include (from inside to outside as the gum wrapper is formed): an aluminum foil layer 12; a polymer layer 14; a paper layer 16; an ink layer 18; and an electron beam cured layer 20. A wax layer 22 is further disposed on top of the electron beam cured layer to seal the counterband. The layers represented in FIG. 1 are represented schematically and are not drawn to scale.

Foil layer 12, polymer layer 14, and paper layer 16 serve substantially the same purposes as their analogous layers in a conventional gum wrapper. The foil layer 12 serves as a barrier to gas transmission. In this embodiment the foil layer 12 comprises aluminum; it being understood that other metal foils are also suitable.

Polymer layer 14 provides adhesion and tear resistance to the laminate. Polymer layer 14 is preferably a layer of polyethylene. The polymer layer 14 can alternatively be formed from other polymers having suitable adhesion and strength properties. A suitable polymer for forming the polymer layer 14 has adequate resistance to punctures and tears to avoid damage from the stresses normally encountered in shipping and storage of chewing gum.

The paper layer 16 adds bulk, serves as a printable substrate, provides texture to the laminate, and provides dead-fold properties. The laminate 10 is preferably provided with printing. Thus, an ink layer 18 is shown in FIG. 1. Ink layer 18 is surface printed onto paper layer 16 using any acceptable printing technique. Of the four traditional printing techniques of offset lithography, flexography, screen-printing and gravure, which are practiced worldwide, gravure printing is currently preferred. The printing unit applies an ink layer 18 to paper layer 16. The printing may contain indicia to identify the source of the gum contained within the counterband. The printing may also include nutritional information or other facts relevant to a potential purchaser, such as an expiration date or recommended sale price. Ideally, the printed image is eye catching and attractive to the consumer, thereby enticing a sale of the gum in which the package formed from laminate 10 is contained. After ink application, the film is preferably run through a drying unit to dry the ink layer 50.

An electron beam curable coating 20 is applied to laminate 10, thus protecting the ink layer 18. The electron beam curable coating 20 is coated on to the paper layer 16, thereby sandwiching ink layer 18 between the electron beam curable coating 20 and paper layer 16. Most any conventional coating unit, well known to those skilled in the art, may be employed for this purpose.

The electron beam curable coating may comprise a number of species of suitable compounds. One group of compounds which has been found to be suitable is sold by Rohm & Haas under the registered trademark MOR-QUIK, owned by Morton International, Inc., a subsidiary of Rohm & Haas. The materials best suited for the electron beam curable coating 20 are a combination of oligomers and monomers. The preferred oligomer is an epoxy acrylate. The preferred monomer is an acrylate. The monomers act as diluents, used to reduce the viscosity of the coating for application purposes. The concentration of monomer is adjustable to provide a wide range of viscosity, such that many conventional coating systems may be employed to apply the electron beam curable coating. The blend ratio of oligomer and monomer also controls physical properties and adhesion of the coating.

Various desirable additives, the exact nature of which will depend on the specifications of the laminate desired, may also be added. Often, defoamers and slip agents are desirable. It is well known to provide such additives to polymer films to improve various qualities such as coefficient of friction, gloss, and processing qualities. The additives provided with the laminate of the present invention become "reacted-in" during crosslinking of the electron beam curable coating. For example, the slip agents, provided to improve the coefficient of friction, are fixed in the crosslinking process, and are therefore not susceptible to the common problems associated with slip agent migration in laminates. The stability of the electron beam curable coating and its additives therefore allows for greater control of the gloss and slip qualities of the laminate, allowing a manufacturer to create laminates according to demanding specifications. In one embodiment, the coefficient of friction of the laminate as measured against itself is preferably 0.2, in order to allow fast processing speeds.

The electron beam curable coating is cured using a suitable electron beam source. Suitable electron beam sources may be obtained commercially from Energy Science, Inc. of Wilmington, Mass.

The amount of energy absorbed, also known as the dose, is measured in units of MegaRads (MR or Mrad) or kiloGrays (kGy), where one Mrad is 10 kGy, one kGy being equal to 1,000 Joules per kilogram. The electron energy output should be within the range of 100 keV to 170 keV at a dosage of 2.0 to 5.0 MegaRads. Preferably, the energy is within the range of 125 keV to 135 keV at a dosage of 3.0 to 4.0 MegaRads.

When exposed to an electron beam from a suitable source, acrylate monomer reacts with the epoxy acrylate chains to form crosslinks. The precursor molecules are excited directly by the ionizing electron beam. Therefore no initiator compounds are required, so no residual volatile organic compounds are present in the finished product. Moreover, curing is substantially instantaneous and provides a cure percentage at or near one hundred percent.

It has been found that the electron beam curable coating of the present invention can be processed at manufacturing speeds in excess of 1200 feet per minute. Such processing speeds are a great improvement over typical lamination speeds which are about 600 feet per minute.

Once the electron beam curable coating 20 has been cured, a wax layer 22 is deposited thereon. The wax layer 22 is desirable for sealing the counterband. The wax layer 22 may be formed from any wax with suitable sealing properties and safe for packaging of food; such waxes are well known to those skilled in the art. Acceptable waxes for use in layer 22 include paraffin wax (preferred), carnauba wax, beeswax, polyethylene wax, microcrystalline wax and candellia wax.

The laminate of this embodiment may be manufactured by a process involving a series of rollers, means to laminate the foil, polymer and paper layers, one or more printing stations, means to coat the electron beam curable coating on to the film, and an electron beam source.

Figure 3:
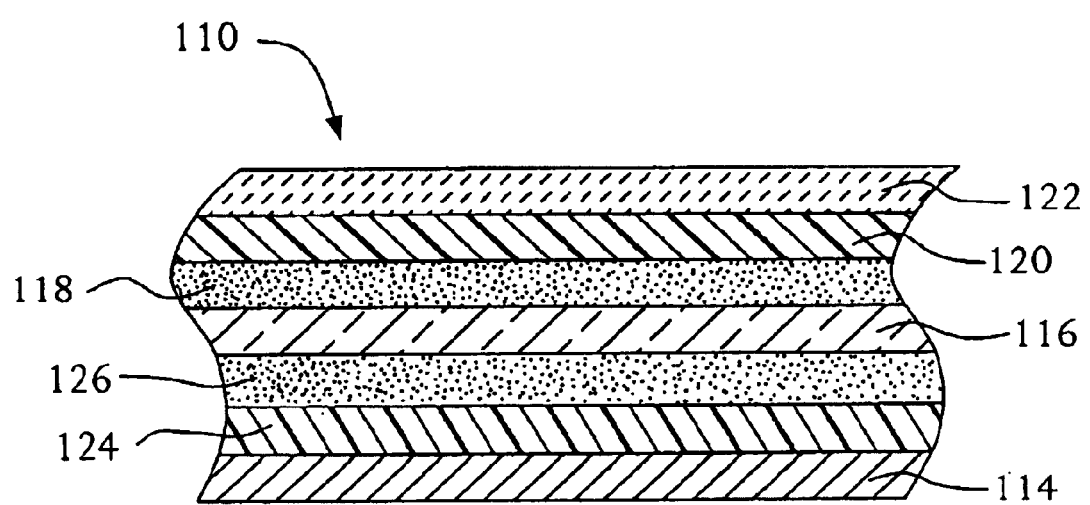
FIG. 3 is a schematic cross sectional view of an alternative embodiment of the laminate according to the present invention.

In an alternative embodiment, represented in FIG. 3, the inner layers of a laminate 110 comprise a polymer web 114, an inorganic layer 124 and a paper layer 116. An adhesive or polymer layer 126 bonds the paper layer 116 to the polymer web 114. The outer layers, surface printed ink 118, electron beam cured coating 120 and wax 122 of this embodiment are substantially the same as the analogous layers of the embodiment shown in FIG. 1.

The polymer layer 114 is preferably a polyethylene terephthalate (PET) web with a thin vacuum deposited metallized layer thereon, the preferred metal being aluminum. Oriented polypropylene has also been found to be effective as the polymer layer 114. The metallized layer in this embodiment is the inorganic layer 124. As with FIG. 1, FIG. 3 is schematic and is not drawn to scale.

The metallized layer is formed through a vacuum deposition process. In the metallization process, a thin layer of metal is vapor deposited onto the polymer layer 114. While the metallized layer is very thin, it can serve as an effective barrier to transmission of all gases when applied to an appropriate substrate. Metallization also provides an aesthetically pleasing appearance.

Aluminum oxide and silicon oxide ($Al_2O_x$ or $SiO_x$) are also useful coatings, particularly as a barrier to oxygen and moisture. Thus, in another embodiment, the inorganic layer 124 is formed from these oxides. The coatings can be applied to the polymer layer 114 by any means known in the art, including the use of a high energy electron beam evaporation process, chemical plasma deposition, and sputtering. Another method of forming an aluminum oxide or silicon oxide coating involves the treating of the sheet with an aqueous solution having an appropriate pH level to cause the formation of aluminum oxide or silicon oxide on the sheet.

The inorganic layer 124 may be only a few hundredths of a mil thick, a mil being 1/1000 of an inch. (It is noteworthy that the thickness of inorganic layer 40 is greatly exaggerated in FIG. 1 for purposes of clarity in defining the structure of the laminate.) The polymer layer 114 and inorganic layer 124 may be referred to jointly as a single metallized polymer layer.

The laminate of this embodiment may be manufactured by a process involving a series of rollers, a vapor deposition apparatus or coating unit, means to laminate the polymer and paper layers, one or more printing stations, means to coat the electron beam curable coating on to the film, and an electron beam source. Various methods of coating an electron beam curable coating on to an oxygen barrier coating and to various polymer webs are described in U.S. Pat. No. 5,725,909 to Shaw et al, hereby incorporated by reference in its entirety.

The process of manufacturing the laminate of the present invention is less costly than that of a conventional laminate. Further, production is less expensive because fewer raw materials are required. In the present invention, the electron beam cured layer performs the function of multiple layers (an adhesive, an OPP layer and a release over-laquer) found in conventional laminates.

Figure 2:
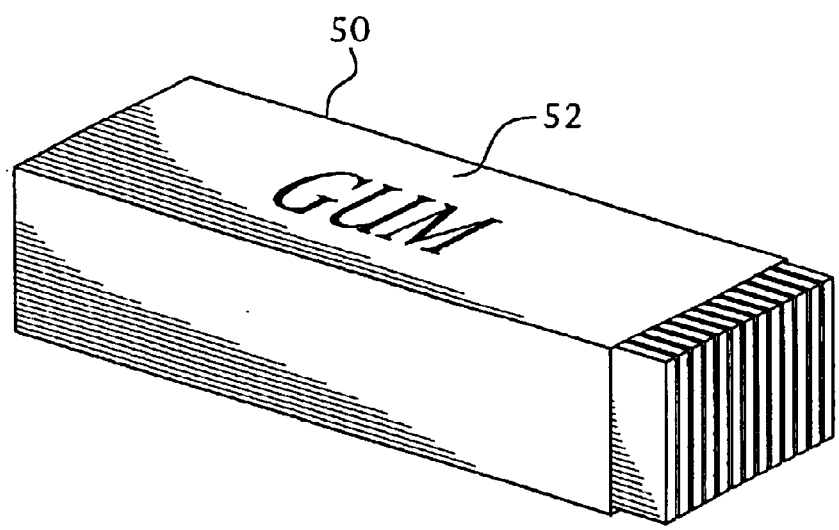
FIG. 2 is a perspective view of a gum package according to the present invention.

As noted above, the laminate of the current invention is ideal for use in the production of counterbands. FIG. 2 shows a counterband 50 formed from the laminate described herein. Using various techniques well known to the skilled artisan, the laminate may be folded and sealed to itself in order to form the counterband 50. The counterband 50 is preferably formed substantially in the shape of a flexible rectangular parallelepiped or cuboid 52. The flexible cuboid 52 should be of the type which can be easily opened to access the gum therein. It is preferable that means for opening the cuboid 52 be provided. Such opening means are contemplated to include tear strips and lines of weakness. The cuboid 52 as shown in FIG. 2 has been opened by a consumer using such an opening means.

The present invention may be embodied in other specific forms without departing from the spirit or essential attributes thereof and, accordingly, reference should be made to the appended claims, rather than to the foregoing specification, as indicating the scope of the invention.

What is claimed is:

1. A gum packaging laminate comprising in order:
   a metal foil;
   a polymer layer;
   a paper layer;
   an ink layer;
   an electron beam cured layer; and
   a wax layer.

2. The laminate of claim 1 wherein the wax layer comprises paraffin wax.

3. The laminate of claim 1 wherein the ink layer is surface printed on the paper layer using a gravure printing technique.

4. The laminate of claim 1 wherein the polymer layer comprises polyethylene.

5. The laminate of claim 1 wherein the electron beam cured layer is formed from a combination of oligomers and monomers.

6. The laminate of claim 5 wherein the oligomer is an epoxy acrylate.

7. The laminate of claim 5 wherein the monomer is an acrylate.

8. The laminate of claim 1 wherein the electron beam cured layer is cured by an electron beam having an energy of from about 100 keV to about 170 keV.

9. The laminate of claim 8 wherein the electron beam cured layer is cured by an electron beam having an energy of from about 125 keV to about 135 keV.

10. The laminate of claim 1 wherein the electron beam cured layer is cured by absorbing a dosage of from about 2.0 to about 5.0 MegaRads.

11. The laminate of claim 10 wherein the electron beam cured layer is cured by absorbing a dosage of from about 3.0 to about 4.0 MegaRads.

12. The laminate of claim 1 wherein the electron beam cured layer comprises slip agents, the slip agents being reacted-in.

13. A gum package comprising a laminate, the laminate comprising in order:
   a polymer layer;
   an inorganic layer;
   a bonding layer;
   a paper layer;
   an ink layer;
   an electron beam cured coating; and
   a wax layer.

14. The gum package of claim 13 wherein the polymer layer is polypropylene.

15. The gum package of claim 13 wherein the polymer layer is polyethylene terephthalate.

16. The gum package of claim 13 wherein the polymer layer is metallized to produce the inorganic layer.

17. The gum package of claim 16 wherein the inorganic layer comprises aluminum.

18. The gum package of claim 13 wherein the inorganic layer comprises an oxide selected from the group consisting of $Al_2O_x$ and $SiO_x$.

19. The gum package of claim 13 wherein the bonding layer comprises an adhesive.

20. The gum package of claim 13 wherein the wax layer comprises carnauba wax.

21. The gum package of claim 13 wherein the electron beam cured layer is formed from an epoxy acrylate oligomer and an acrylate monomer.

22. The gum package of claim 13 wherein the electron beam cured layer further comprises slip agents, the slip agents being reacted-in.

23. A gum package comprising:
   a multi-layer laminate comprising a paper layer and a gas barrier layer;
   a coating of electron beam cured, crosslinked network of monomers and oligomers on the paper layer, the coating comprising fixed processing additives; and
   wax disposed on the electron beam cured coating for sealing the gum package, wherein the fixed processing additives do not interfere with the sealing ability of the wax.

24. The gum package of claim 23 wherein the fixed processing additives comprise a slip agent.

25. A counterband for wrapping a plurality of individual sticks of chewing gum and for providing long term resistance to passage of gas and moisture, the counterband comprising in order:
- a metal foil;
- a polymer adhesion layer;
- a paper layer;
- ink surface printed on the paper layer opposite the polymer adhesion layer;
- an electron beam cured layer coated and cured over the ink, the electron beam cured layer comprising slip agents that have become reacted-in during the curing process; and
- wax deposited on the electron beam cured layer for sealing the counterband; wherein the reacted in slip agents do not interfere with the ability of the wax to seal the counterband.

* * * * *